United States Patent
Hukkanen et al.

(10) Patent No.: US 8,979,321 B2
(45) Date of Patent: Mar. 17, 2015

(54) LIGHT GUIDE

(71) Applicant: Ledil Oy, Salo (FI)

(72) Inventors: Hannu Hukkanen, Salo (FI); Pasi Vallevuori, Turku (FI)

(73) Assignee: Ledil Oy, Salo (FI)

( * ) Notice: Subject to any disclaimer, the term of this patent is extended or adjusted under 35 U.S.C. 154(b) by 84 days.

(21) Appl. No.: 13/788,292

(22) Filed: Mar. 7, 2013

(65) Prior Publication Data

US 2014/0247592 A1 Sep. 4, 2014

(30) Foreign Application Priority Data

Mar. 1, 2013 (FI) ...................................... 20135195

(51) Int. Cl.
- *F21V 7/00* (2006.01)
- *F21V 8/00* (2006.01)
- *F21V 5/04* (2006.01)
- *G02B 19/00* (2006.01)

(52) U.S. Cl.
CPC ................ *G02B 6/0001* (2013.01); *F21V 5/04* (2013.01); *G02B 19/0028* (2013.01); *G02B 19/0061* (2013.01)
USPC .................. 362/308; 362/311.02; 362/311.06; 362/551

(58) Field of Classification Search
USPC ........... 362/551, 217.05, 308, 311.02, 311.06
See application file for complete search history.

(56) References Cited

U.S. PATENT DOCUMENTS

| | | |
|---|---|---|
| 2009/0067179 A1 | 3/2009 | Chaves et al. |
| 2011/0194295 A1 | 8/2011 | Householder et al. |
| 2012/0113621 A1 | 5/2012 | Lee et al. |
| 2012/0275150 A1 | 11/2012 | Yokotani et al. |
| 2013/0039090 A1* | 2/2013 | Dau et al. ...................... 362/551 |

FOREIGN PATENT DOCUMENTS

WO 0107828 A1 2/2001

OTHER PUBLICATIONS

Finnish Search Report, dated Nov. 26, 2013, from corresponding FI application.
International Search Report, dated Jun. 24, 2014, from corresponding PCT application.

* cited by examiner

*Primary Examiner* — Ali Alavi
(74) *Attorney, Agent, or Firm* — Young & Thompson

(57) ABSTRACT

A light guide (201) including a transparent element is presented. The transparent element includes an optical diverter section (204) including one or more reflective surfaces (205) forming walls of a notch (206) extending into the diverter section, where the reflective surfaces provide total reflections for directing light into directions lateral with respect to an arrival direction of the light. The transparent element includes an optical channel section (208) for receiving the light from a light source and for directing the light to the optical diverter section. The optical channel section includes a side surface (209) shaped to provide total reflections for directing light to the optical diverter section. The optical channel section makes it possible to place the light source a distance apart from the optical diverter section and also to prevent or at least to reduce direct propagation of light from the light source to the lateral directions.

16 Claims, 10 Drawing Sheets

LIGHT GUIDE

FIELD OF THE INVENTION

The invention relates generally to illuminating engineering. More particularly, the invention relates to a light guide for modifying a light distribution pattern of a light source that can be, for example but not necessarily, a light emitting diode "LED".

BACKGROUND

Distribution of light produced by a light source can be important or even critical in some applications. The light source can be, for example but not necessarily, a light emitting diode "LED", a filament lamp, or a gas-discharge lamp. In many applications, there is need to direct light emitted by a light source into lateral directions so that the light is substantially directed along a geometric plane or along a geometric line. FIG. 1 shows a view of a section taken from an exemplifying light guide 101 according to the prior art for modifying a light distribution pattern of a light source 102. A light guide of the kind depicted in FIG. 1 is described, for example, in the publication EP1200772. The light guide 101 can be rotationally symmetric with respect to a geometric line 120 shown in FIG. 1. The geometric line 120 is parallel with the z-axis of a coordinate system 199. The light guide 101 is made of transparent material having refractive index greater than unity. The light guide comprises a reflective surface 105 forming an apex 106 extending into the light guide as illustrated in FIG. 1. The reflective surface is shaped to provide total reflections for directing light into directions lateral with respect to an arrival direction of the light. The light guide comprises a penetrable surface 107 on the routes of the light reflected from the reflective surface. Some of the light beams radiated by the light source 102 are depicted with dashed line arrows in FIG. 1.

In many applications, it is desirable that there are no direct light propagation paths from the light source to directions whereto the light is wanted to be directed because direct light propagation paths may cause local peaks in the light distribution pattern and thus cause unpleasant glare. In the light guide shown in FIG. 1, there is a groove 121 arranged to prevent direct propagation of light to the penetrable surface 107. A wall 122 of the groove is roughened so as to provide a scattered light penetration as illustrated in FIG. 1. An inconvenience related to the light guide illustrated in FIG. 1 is that the roughened wall 122 may cause attenuation and thus reduce the amount of light directed to the desired directions.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new light guide for modifying the light distribution pattern of a light source. A light guide according to the invention comprises a transparent element made of transparent material having the refractive index greater than unity. The transparent element comprises an optical diverter section and an optical channel section. The optical diverter section comprises:
  one or more reflective surfaces constituting walls of a notch extending into the diverter section, the one or more reflective surface being shaped to provide total reflections for directing light into directions lateral with respect to a direction in which the notch extends into the diverter section, and
  one or more penetrable surfaces each being on a route of light reflected from one of the one or more reflective surfaces.

The optical channel section is arranged to receive light from the light source and to direct at least a part of the received light to the one or more reflective surfaces of the optical diverter section. The optical channel section comprises a side surface shaped to provide total reflections for directing, towards the optical diverter section, at least a part of light falling to the side surface.

As the side surface of the optical channel section is shaped to provide total reflections of the kind mentioned above, direct light propagation paths from the light source to the directions whereto the light is wanted to be directed are eliminated or at least significantly reduced. Furthermore, the optical channel section makes it possible to place the light source a distance apart from the optical diverter section. For example, the light guide can be installed so that the optical channel section extends through an aperture of a board or another plate so that the light source is on one side of the board and the optical diverter section is on the other side of the board.

In accordance with the invention, there is provided also a new illuminator device comprising at least one light source and at least one light guide according to the invention. The at least one light source may comprise, for example, one or more light emitting diodes "LED".

A light guide according to an exemplifying and non-limiting embodiment of the invention is a single piece of transparent material that can be manufactured, for example, by mold casting. In accordance with the invention, there is provided also a new mold having a form suitable for manufacturing, by mold casting, the above-mentioned single piece of the transparent material.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments of the invention and their advantages are explained in greater detail below with reference to the accompanying drawings, in which:

FIG. 1 has already been explained in the Background-section of this document.

DESCRIPTION OF EXEMPLIFYING EMBODIMENTS

Figure 1:
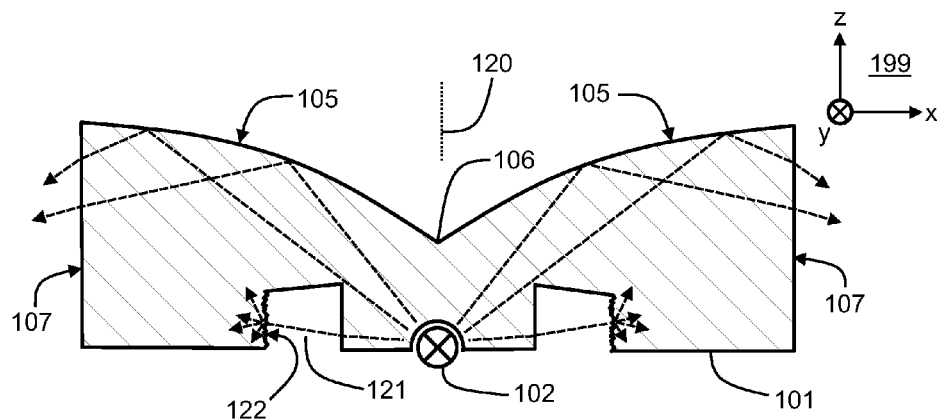
FIG. 1 shows a section view of a light guide according to the prior art.
Figure 2A:
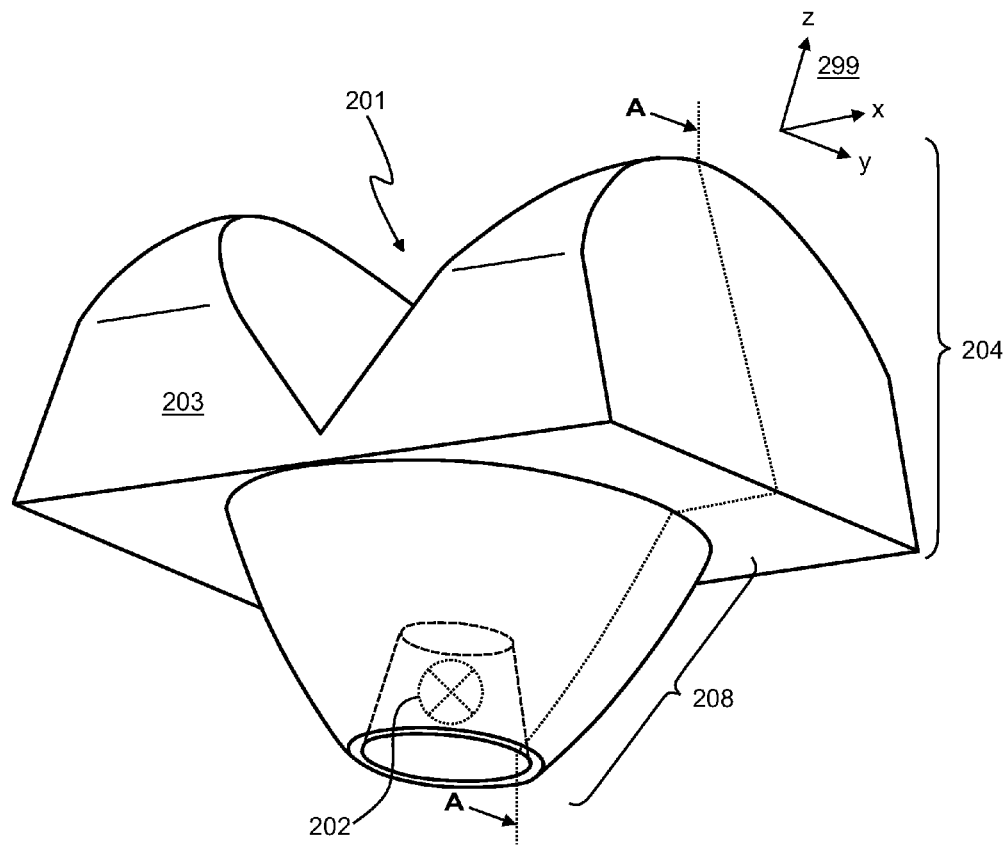
FIGS. 2a, 2b and 2c illustrate a light guide according to an exemplifying embodiment of the invention.
Figure 2B:
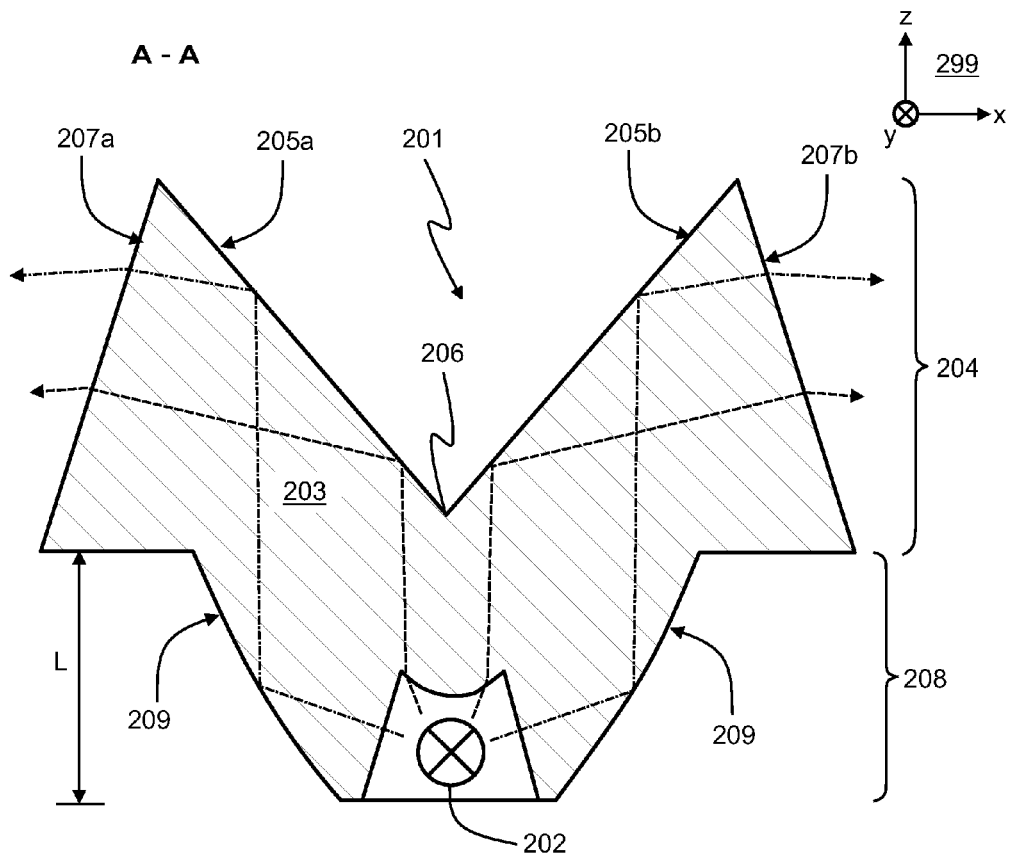
Figure 2C:
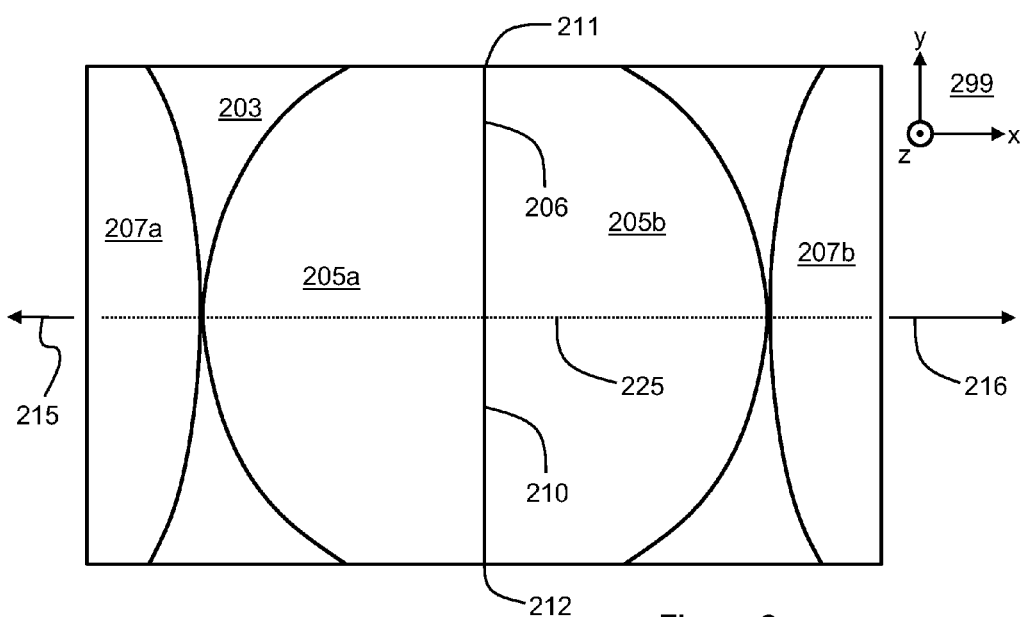

FIG. 2a shows a perspective view of a light guide 201 according to an exemplifying embodiment of the invention for modifying the light distribution pattern of a light source 202 that can be, for example but not necessarily, a light emitting diode "LED", a filament lamp, or a gas-discharge lamp. FIG. 2b shows a view of a section taken along a geometric plane that is parallel with the xz-plane of a coordinate system 299 and coincides with a dashed line A-A show in FIG. 2a. FIG. 2c shows the light guide seen from above, i.e. the direction of looking is against the positive z-direction of the coordinate system 299. The light guide 201 comprises a transparent element 203 made of solid transparent material having the refractive index greater than unity. The transparent material can be, for example, acrylic plastic, polycarbonate, optical silicone, or glass. The method of manufacture of the transparent element 203 can be for example mold casting. The transparent element 203 comprises an optical diverter section 204 and an optical channel section 208. The optical diverter section 204 comprises reflective surfaces 205a and 205b that constitute walls of a notch forming an apex 206 that extends into the diverter section as illustrated in FIG. 2b. The reflective surfaces 205a and 205b are shaped to provide total reflections for directing light into directions lateral with respect to the arrival direction of the light. The optical diverter section 204 comprises penetrable surfaces 207a and 207b on substantially opposite sides of the transparent element 203 on routes of the light reflected from the reflective surface 205a or 205b. The penetrable surfaces 207a and 207b can be planar and they can be oriented so that they refract the light in a desired way. It is also possible that the penetrable surfaces 207a and 207b are convex or concave so as to focus or disperse the light. Furthermore, the penetrable surfaces 207a and 207b may have undulating forms for scattering the light. Yet furthermore, the penetrable surfaces 207a and 207b can be color mixing surfaces so that they comprise converging and diverging deviations from a planar shape. In a color mixing surface light beams exhibiting different wavelengths are effectively mixed thus producing a light pattern which contains all wavelengths evenly distributed across the pattern. By equipping the light guide 201 with color mixing surfaces of the kind described above, different colors resulting from defects in the light source are effectively mixed thus producing a solid light pattern. The transparent element 203 further comprises an optical channel section 208 for receiving light from the light source 202 and for directing at least a part of the received light to the reflective surfaces 205a and 205b of the optical diverter section 204. The optical channel section 208 comprises a side surface 209 shaped to provide total reflections for directing, towards the optical diverter section 204, light falling to the side surface 209. The optical channel section 208 can be shaped to collimate the light falling to the side surface 209 so that light beams reflected from the side surface are substantially parallel. The side surface 209 can have, for example but not necessarily, a parabolic form. A part of the light emitted by the light source 202 is reflected only from the reflective surface 205a or 205b of the optical diverter section 204 and another part of the light is reflected first from the side surface 209 of the optical channel section 208 and then from the reflective surface 205a or 205b. In FIG. 2b, some of the light beams reflected only from the reflective surface 205a or 205b are depicted with dashed line arrows and some of the light beams reflected first from the side surface 209 and then from the reflective surface 205a or 205b are depicted with dash-and-dot line arrows.

In the exemplifying light guide 201 illustrated in FIGS. 2a, 2b and 2c, the reflective surfaces 205a and 205b intersect each other along a line 210 having first and second ends 211 and 212 as illustrated in FIG. 2c. The line 210 where the reflective surfaces 205a and 205b intersect each other constitutes the apex 206. In the exemplifying case illustrated in FIGS. 2a, 2b and 2c, the reflective surfaces 205a and 205b are planar but it is also possible that the reflective surface 205a and/or the reflective surface 205b is/are non-planar, e.g. curved or undulating, and intersect each other along a non-straight, e.g. curved or undulating, line.

The light guide 201 illustrated in FIGS. 2a, 2b and 2c is configured to direct the light emitted by the light source 202 to two substantially mutually opposite directions as illustrated in FIG. 2b. The transparent element 203 is symmetric with respect to a geometric plane 225 that is parallel with the xz-plane of the coordinate system 299, the geometric plane 225 being illustrated in FIG. 2c. Therefore, an angle between projections 215 and 216 of main axes of distribution patterns of the light reflected from the reflective surface 205a and penetrated the penetrable surface 207a and the light reflected from the reflective surface 205b and penetrated the penetrable surface 207b is substantially 180 degrees. The projections 215 and 216 are on a geometric plane that is perpendicular to the length L of the optical channel section 208, i.e. parallel with the xy-plane of the coordinate system 299. The projections 215 and 216 are illustrated in FIG. 2c and the length L of the optical channel section is illustrated in FIG. 2b.

Figure 3A:
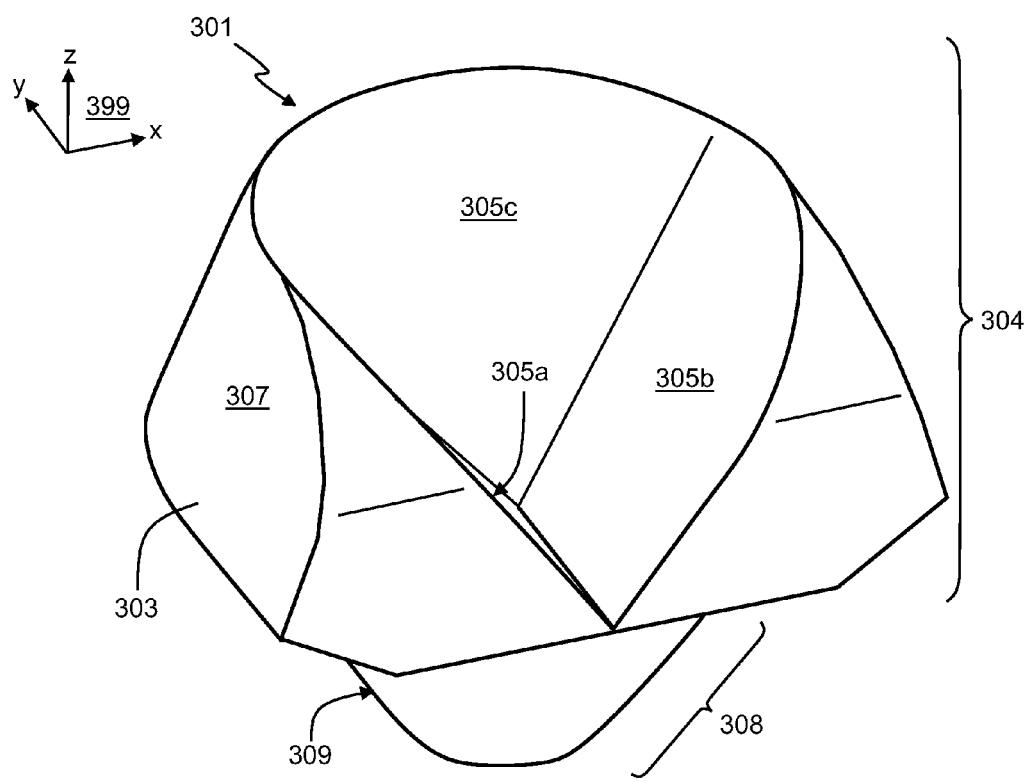
FIGS. 3a and 3b illustrate a light guide according to an exemplifying embodiment of the invention.
Figure 3B:
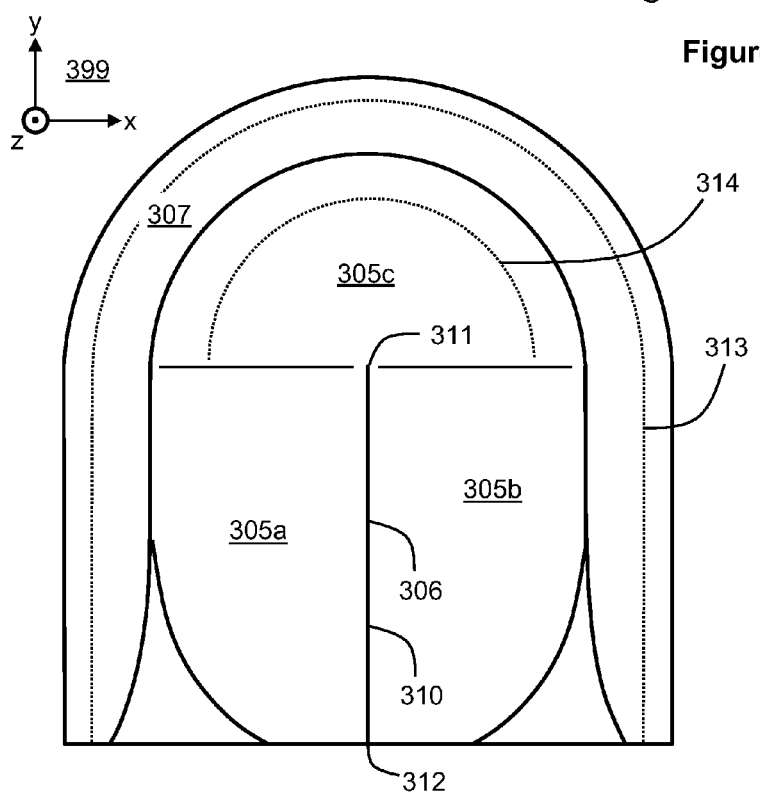

FIG. 3a shows a perspective view of a light guide 301 according to an exemplifying embodiment of the invention for modifying the light distribution pattern of a light source. FIG. 3b shows the light guide seen from above, i.e. the direction of looking is against the positive z-direction of a coordinate system 399. The light guide 301 comprises a transparent element 303 that comprises an optical diverter section 304 and an optical channel section 308. The optical diverter section 304 comprises reflective surfaces 305a, 305b and 305c that constitute walls of a notch forming an apex 306 that extends into the diverter section. The optical diverter section 304 comprises a penetrable surface 307 on routes of the light reflected from the reflective surface 305a, 305b or 305c. The transparent element further comprises an optical channel section 308 for receiving light from a light source and for directing the received light to the optical diverter section 304. The optical channel section 308 comprises a side surface 309 shaped to provide total reflections for directing light to the optical diverter section 304.

Figure 3C:
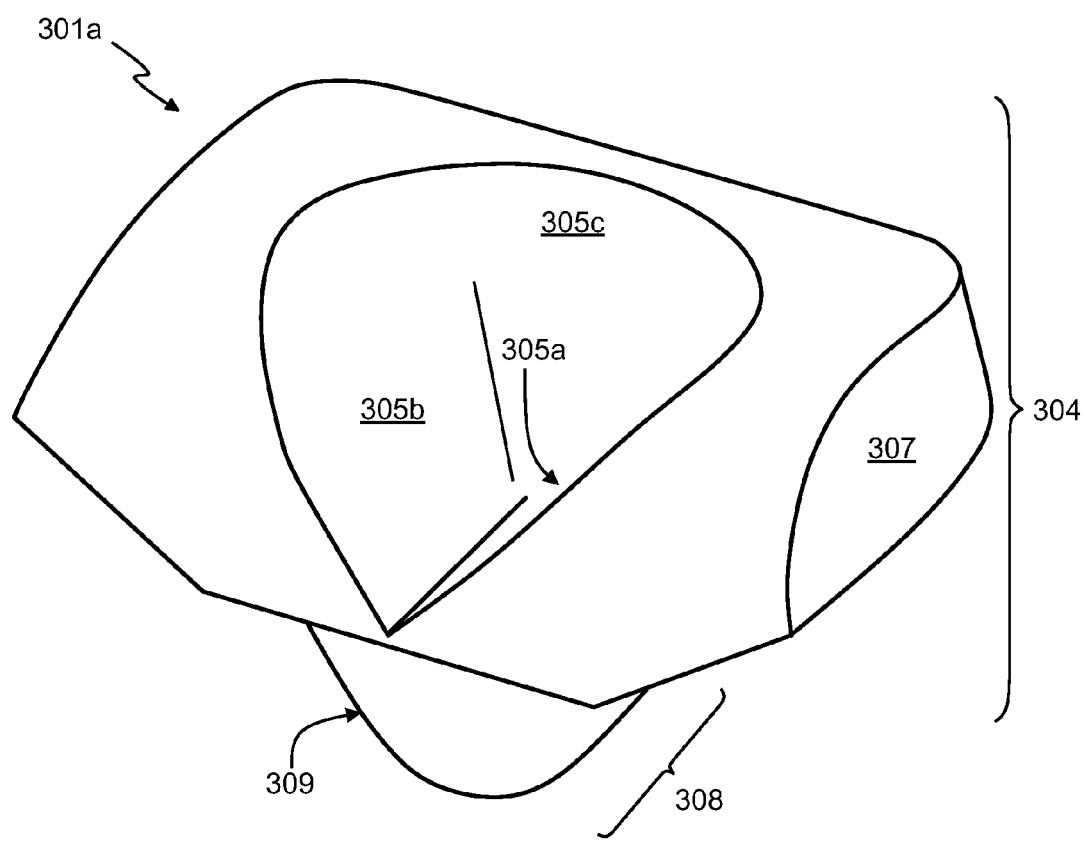
FIG. 3c illustrates a light guide according to an exemplifying embodiment of the invention.

The reflective surfaces 305a and 305b intersect each other along a line 310 that has first and second ends 311 and 312. The line 310 where the reflective surfaces 305a and 305b intersect each other constitutes the apex 306. The reflective surface 305c joins the reflective surfaces 305a and 305b and the first end 311 of the line 310 constituting the apex. In the exemplifying case illustrated in FIGS. 3a and 3b, a section profile 314 of the reflective surface 305c is a round-shaped arc extending from the reflective surface 305a to the reflective surface 305b, and a section profile 313 of the penetrable surface 307 has a U-shaped form, where the section profiles 313 and 314 are taken along a geometric plane that is perpendicular to a length of the optical channel section 380, i.e. parallel with the xy-plane of the coordinate system 399. The light guide 301 is configured to direct the light emitted by a light source to a sector that covers about 180 degrees in the xy-plane of the coordinate system. The spread-angle of the light in the z-direction of the coordinate system is determined by shapes of the reflective surface 305 and the penetrable surface 307. It is also possible that the section profile 314 has some other form e.g. a fractional line and/or the section profile 313 has some other form e.g. a fractional line. In this case, the light distribution pattern would be undulating in the xy-plane of the coordinate system 399. FIG. 3c shows a perspective view of a light guide 301a according to an exemplifying embodiment of the invention. In this case, the section profile of the penetrable surface 307 differs from that shown in FIG. 3b.

Figure 4A:
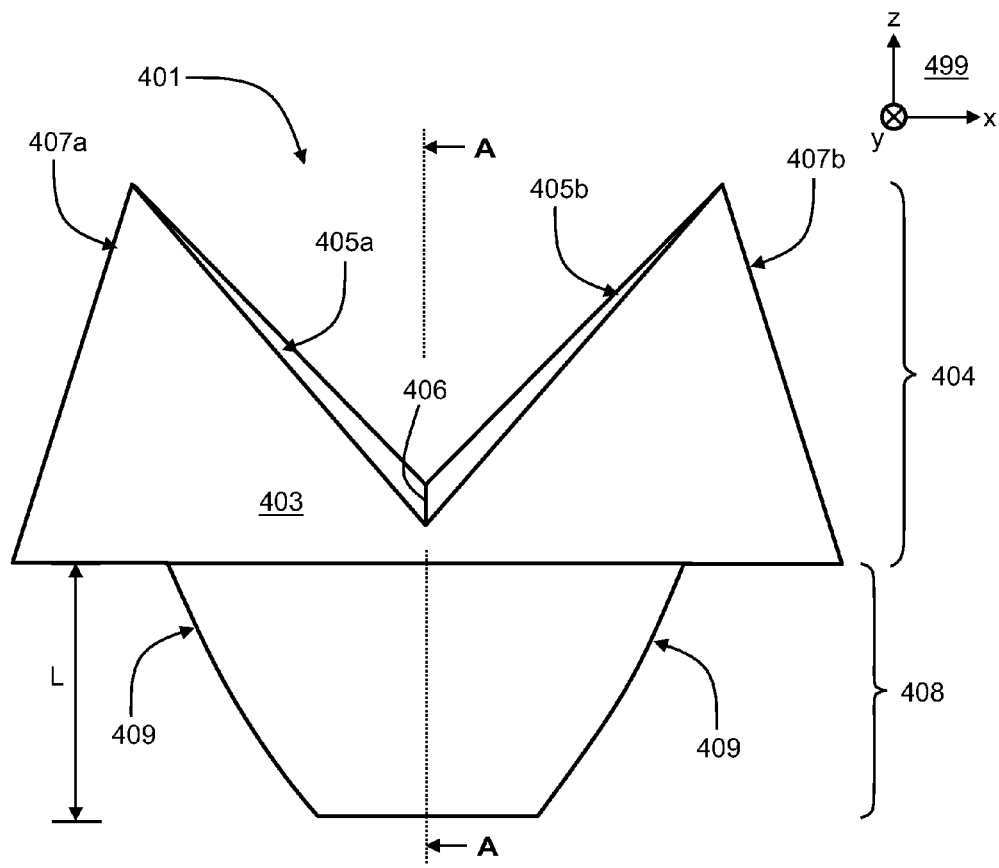
FIGS. 4a, 4b and 4c illustrate a light guide according to an exemplifying embodiment of the invention.
Figure 4B:
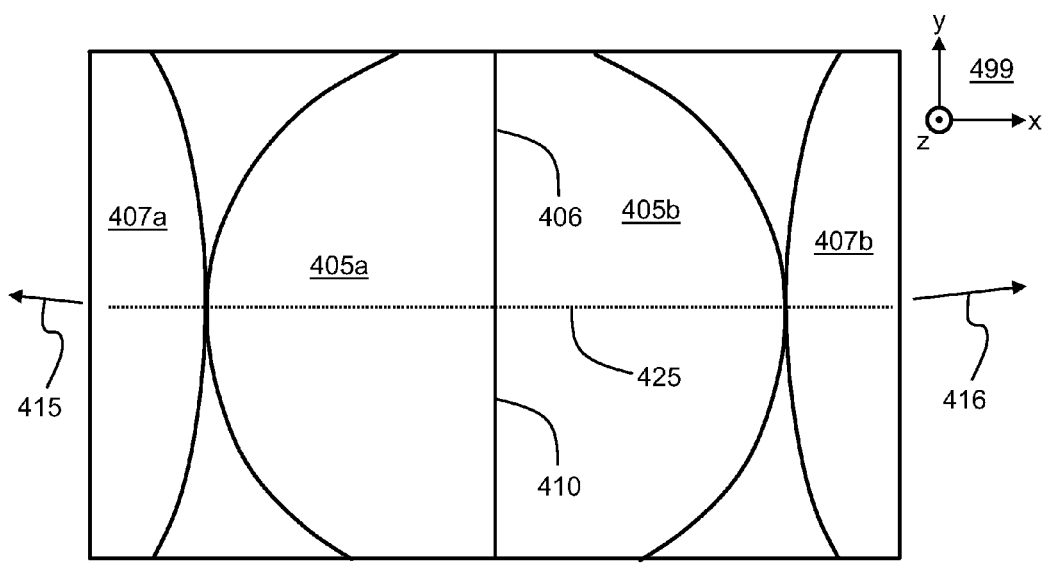
Figure 4C:
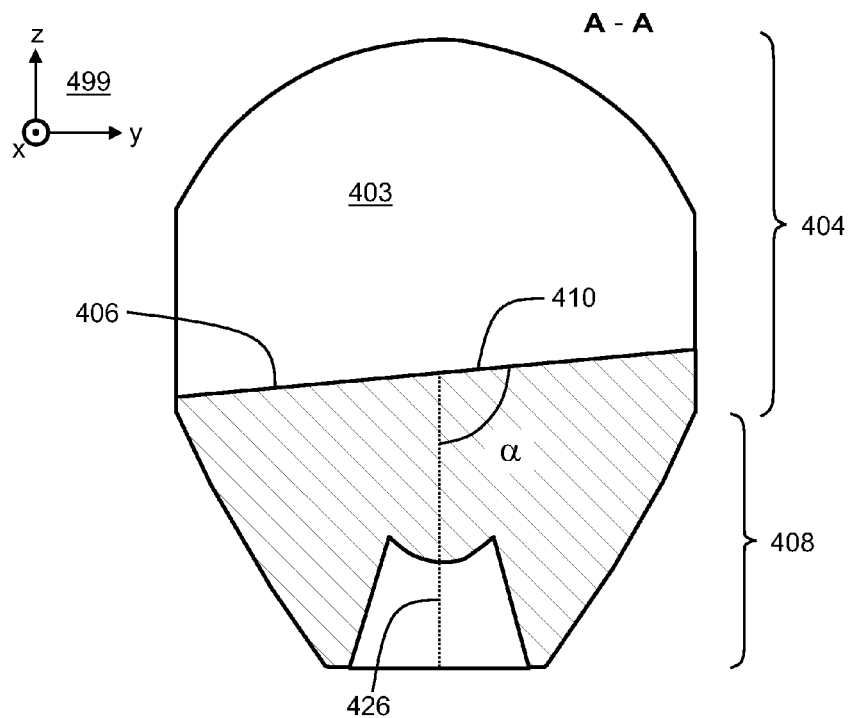

FIG. 4a shows a side view of a light guide 401 according to an exemplifying embodiment so that the direction of looking is along the positive y-direction of a coordinate system 499. FIG. 4b shows the light guide seen from above, i.e. the direction of looking is against the positive z-direction of the coordinate system 499. FIG. 4c shows a view of a section taken along a plane that is parallel with the yz-plane of the coordinate system 499 and coincides with a dashed line A-A show in FIG. 4a. The light guide 401 comprises a transparent element 403 that comprises an optical diverter section 404 and an optical channel section 408. The optical diverter section 404 comprises reflective surfaces 405a and 405b that constitute walls of a notch forming an apex 406 that extends into the diverter section as illustrated in FIG. 4a. The optical diverter section 404 comprises penetrable surfaces 407a and 407b on substantially opposite sides of the transparent element 403 on routes of the light reflected from the reflective surface 405a or 405b. The transparent element 403 further comprises an optical channel section 408 for receiving light from a light source and for directing the received light to the optical diverter section 404. The optical channel section 408 comprises a side surface 409 shaped to provide total reflections for directing light to the optical diverter section 404. The reflective surfaces 405a and 405b intersect each other along a line 410 that constitutes the apex 406. An angle a between the line 410 constituting the apex 406 and a geometric line 426 parallel with the length L of the optical channel section differs from 90 degrees. The angle a can be, for example, on the range 95 . . . 120 degrees. The length L and the angle a are illustrated in FIG. 4c, where the geometric line 426 is parallel with the z-axis of the coordinate system 499. As the angle a differs from 90 degrees, the transparent element 403 is asymmetric with respect to a geometric plane 425 that is illustrated in FIG. 4b and is parallel with the xz-plane of the coordinate system 499. Therefore, an angle between projections 415 and 416 of main axes of distribution patterns of the light reflected from the reflective surface 405a and penetrated the penetrable surface 407a and the light reflected from the reflective surface 405b and penetrated the penetrable surface 407b differs from 180 degrees. The projections 415 and 416 are on a geometric plane that is perpendicular to the length L of the optical channel section 408, i.e. parallel with the xy-plane of the coordinate system 499. The projections 415 and 416 are illustrated in FIG. 4b and the length L of the optical channel section is illustrated in FIG. 4a.

Figure 5A:
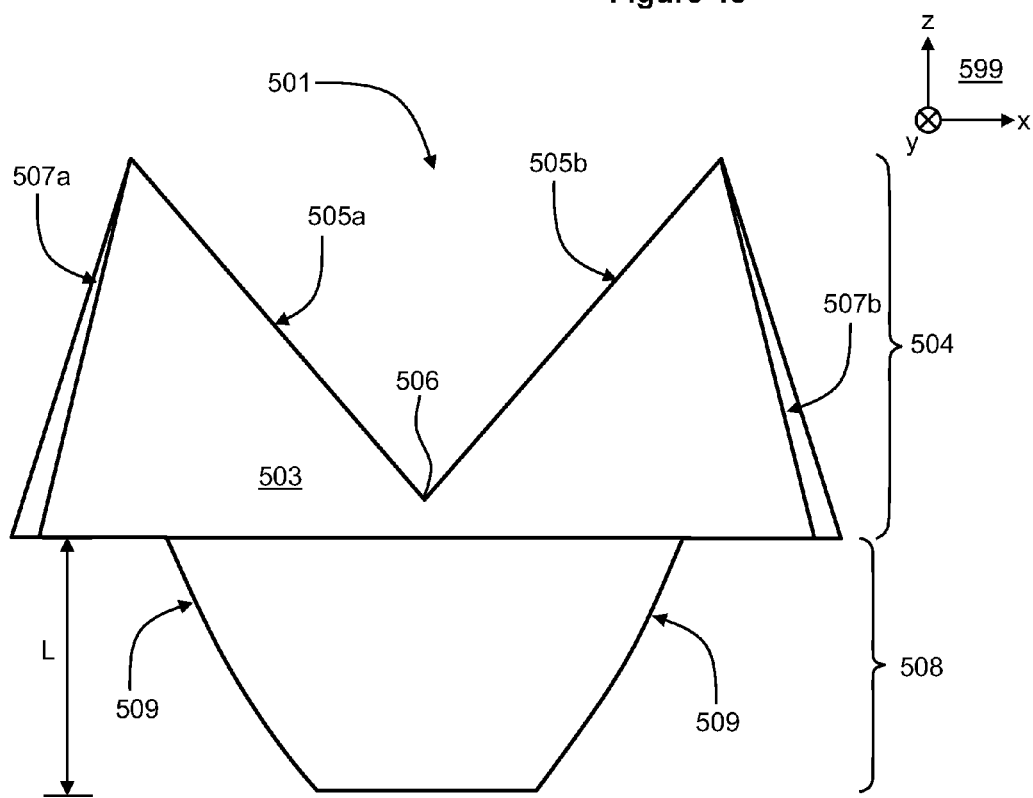
FIGS. 5a and 5b illustrate a light guide according to an exemplifying embodiment of the invention.
Figure 5B:
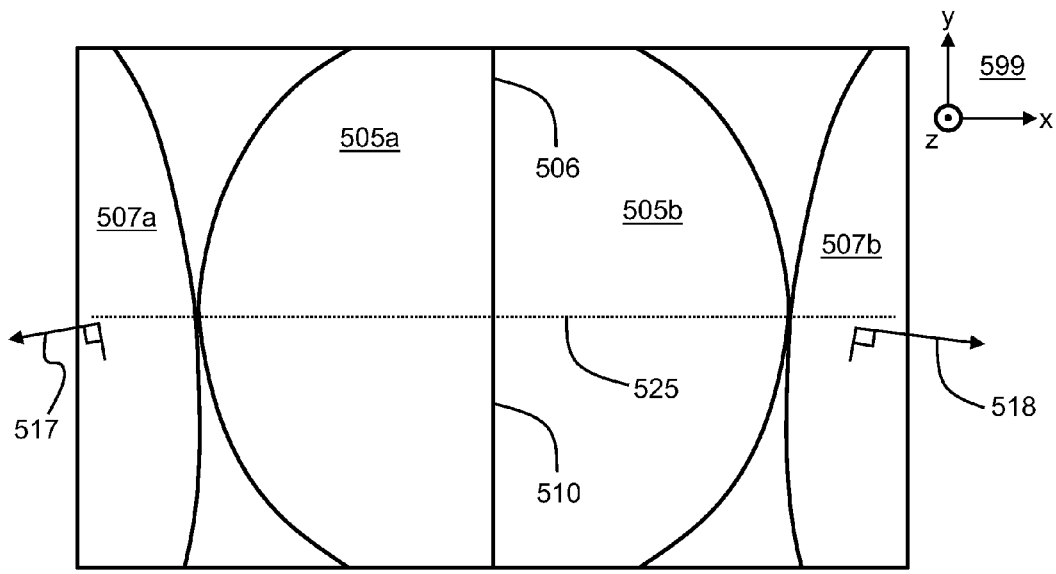

FIG. 5a shows a side view of a light guide 501 according to an exemplifying embodiment so that the direction of looking is along the positive y-direction of a coordinate system 599. FIG. 5b shows the light guide seen from above, i.e. the direction of looking is against the positive z-direction of the coordinate system 599. The light guide 501 comprises a transparent element 503 that comprises an optical diverter section 504 and an optical channel section 508. The optical diverter section 504 comprises reflective surfaces 505a and 505b that constitute walls of a notch forming an apex 506 that extends into the diverter section as illustrated in FIG. 5a. The optical diverter section 504 comprises penetrable surfaces 507a and 507b on substantially opposite sides of the transparent element 503 on routes of the light reflected from the reflective surface 505a or 505b. The transparent element 503 further comprises an optical channel section 508 for receiving light from a light source and for directing the light to the optical diverter section 504. The optical channel section 508 comprises a side surface 509 shaped to provide total reflections for directing light to the optical diverter section 504. The reflective surfaces 505a and 505b intersect each other along a line 510 that constitutes the apex 506. An angle between projections of the perpendiculars 517 and 518 of the penetrable surfaces 507a and 507b differs from 180 degrees. Therefore, the transparent element 503 is asymmetric with respect to a geometric plane 525 that is illustrated in FIG. 5b and is parallel with the xz-plane of the coordinate system 599. Thus, an angle between projections of main axes of distribution patterns of the light reflected from the reflective surface 505a and penetrated the penetrable surface 507a and the light reflected from the reflective surface 505b and penetrated the penetrable surface 507b differs from 180 degrees. The above-mentioned projections are on a geometric plane that is perpendicular to the length L of the optical channel section, i.e. parallel with the xy-plane of the coordinate system 599. The perpendiculars 517 and 518 of the penetrable surfaces 507a and 507b are illustrated in FIG. 5b and the length L of the optical channel section is illustrated in FIG. 5a. The angle between the perpendiculars 517 and 518 can be, for example, on the range 160 . . . 175 degrees.

Figure 6A:
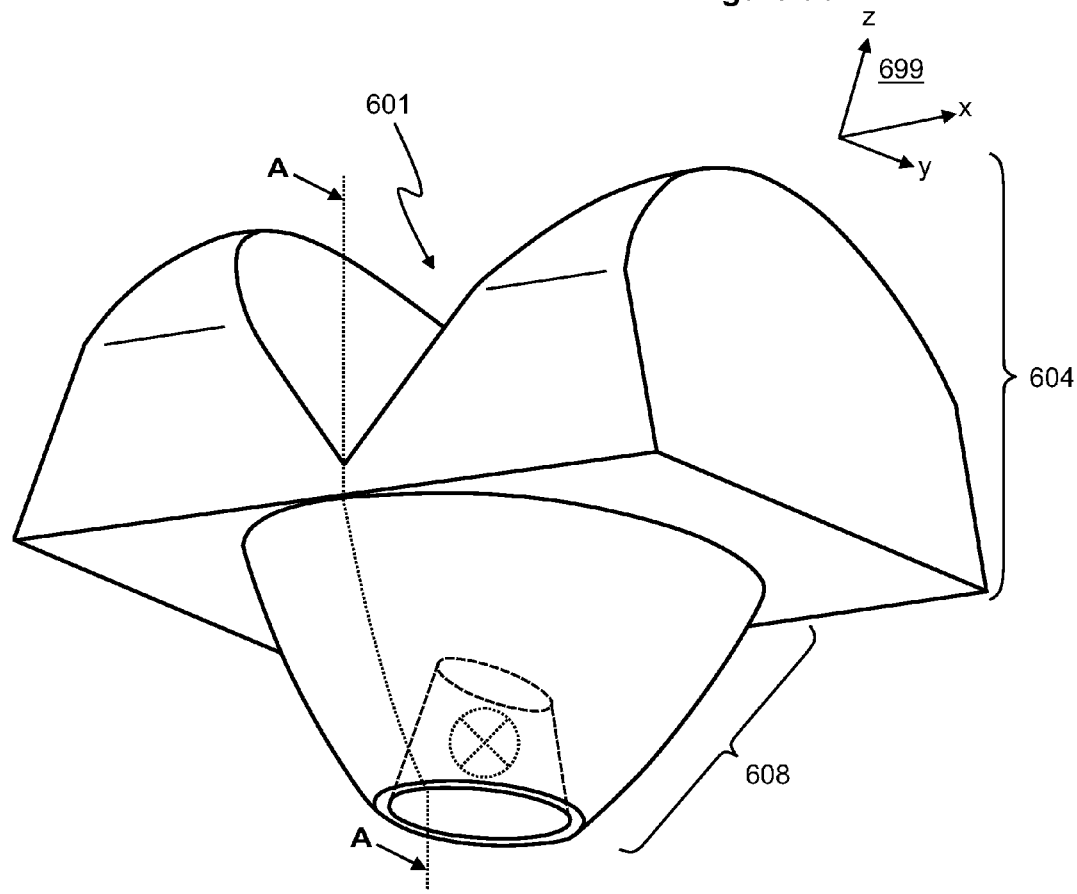
FIGS. 6a and 6b illustrate a light guide according to an exemplifying embodiment of the invention.
Figure 6B:
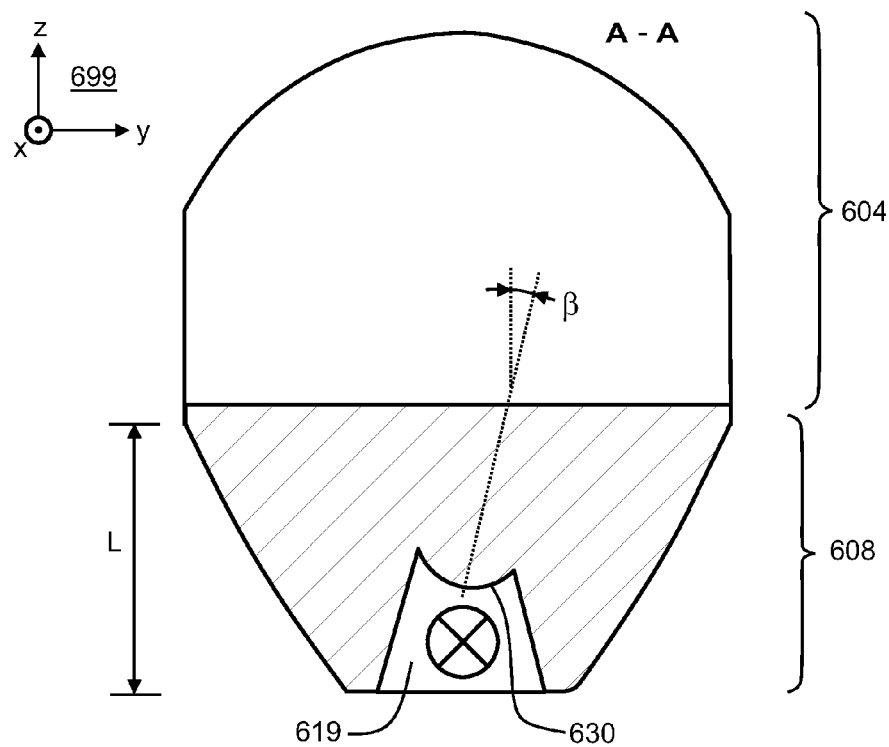

FIG. 6a shows a perspective view of a light guide 601 according to an exemplifying embodiment of the invention. FIG. 6b shows a view of a section taken along a plane that is parallel with the yz-plane of a coordinate system 699 and coincides with a dashed line A-A show in FIG. 6a. The light guide 601 is otherwise similar to the light guide 201 illustrated in FIGS. 2a, 2b and 2c, but the bottom 630 of the cavity 619 is inclined with respect to the length L of the optical channel section 608 so as to skew the distribution of the light arriving at the optical diverter section 604. Thus, a similar effect of asymmetry is achieved as in conjunction with the light guides 401 and 501 illustrated in FIGS. 4a, 4b, 4c, 5a and 5b. The inclination angle β shown in FIG. 6b can be, for example, on the range 5 . . . 15 degrees.

Figure 7:
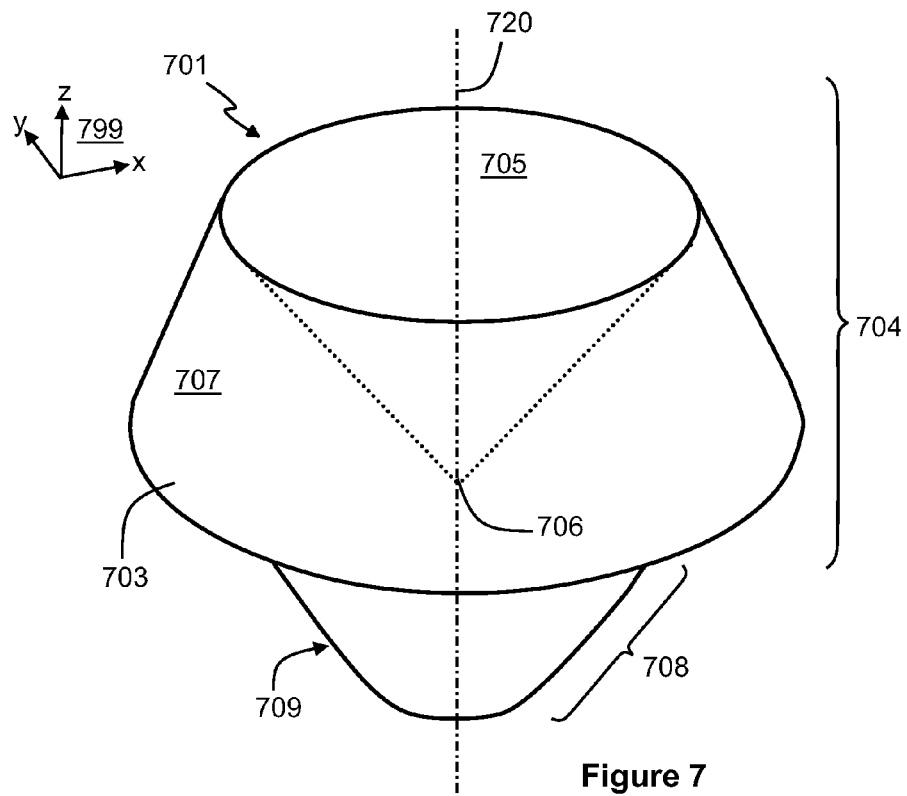
FIG. 7 illustrates a light guide according to an exemplifying embodiment of the invention.

FIG. 7 shows a perspective view of a light guide 701 according to an exemplifying embodiment of the invention. The light guide comprises a transparent element 703 that comprises an optical diverter section 704. The optical diverter section 704 comprises a reflective surface 705 that constitute walls of a notch forming an apex 706 that extends into the diverter section as illustrated in FIG. 7. In the exemplifying case illustrated in FIG. 7, the transparent element 703 is substantially rotationally symmetric with respect to a geometric center line 720 that is parallel with a length of the optical channel section, i.e. parallel with the z-axis of a coordinate system 799. In this exemplifying case, the reflective surface 705 is conical and the apex 706 has a point-form tip. The optical diverter section 704 comprises an annular penetrable surface 707. The transparent element 703 further comprises an optical channel section 708 for receiving light from a light source and for directing the light to the optical diverter section 704. The optical channel section 708 comprises a side surface 709 shaped to provide total reflections for directing light to the optical diverter section 704.

Figure 8A:
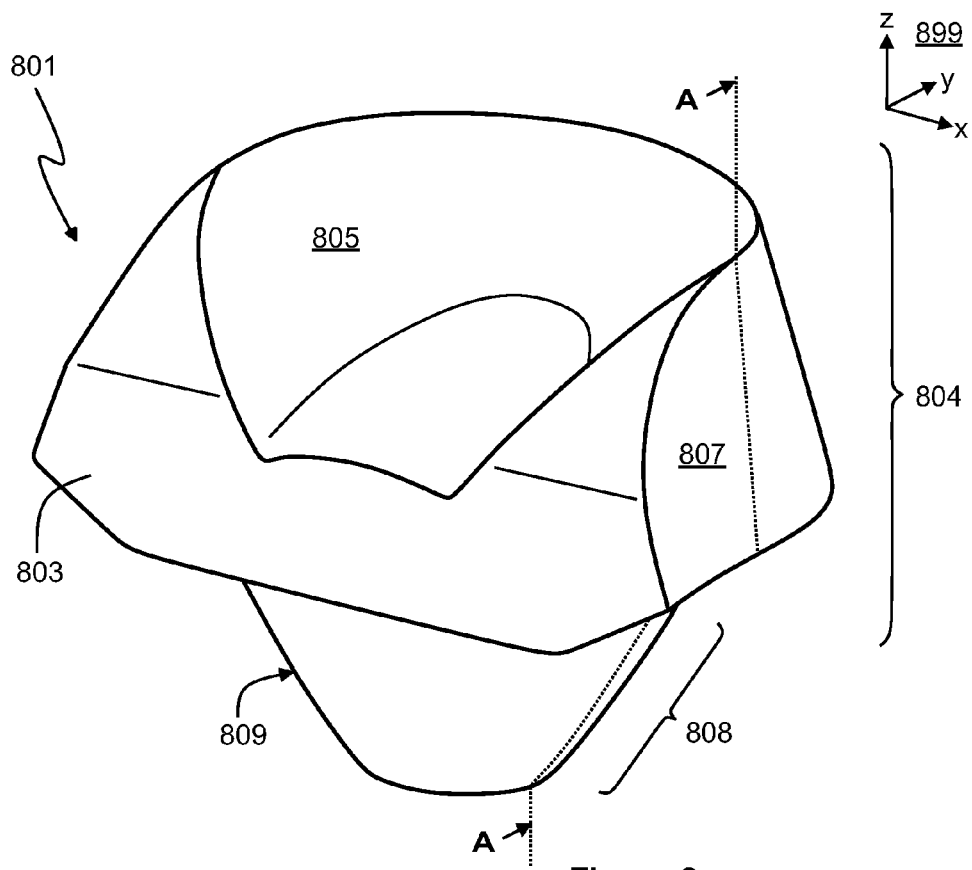
FIGS. 8a and 8b illustrate a light guide according to an exemplifying embodiment of the invention.
Figure 8B:
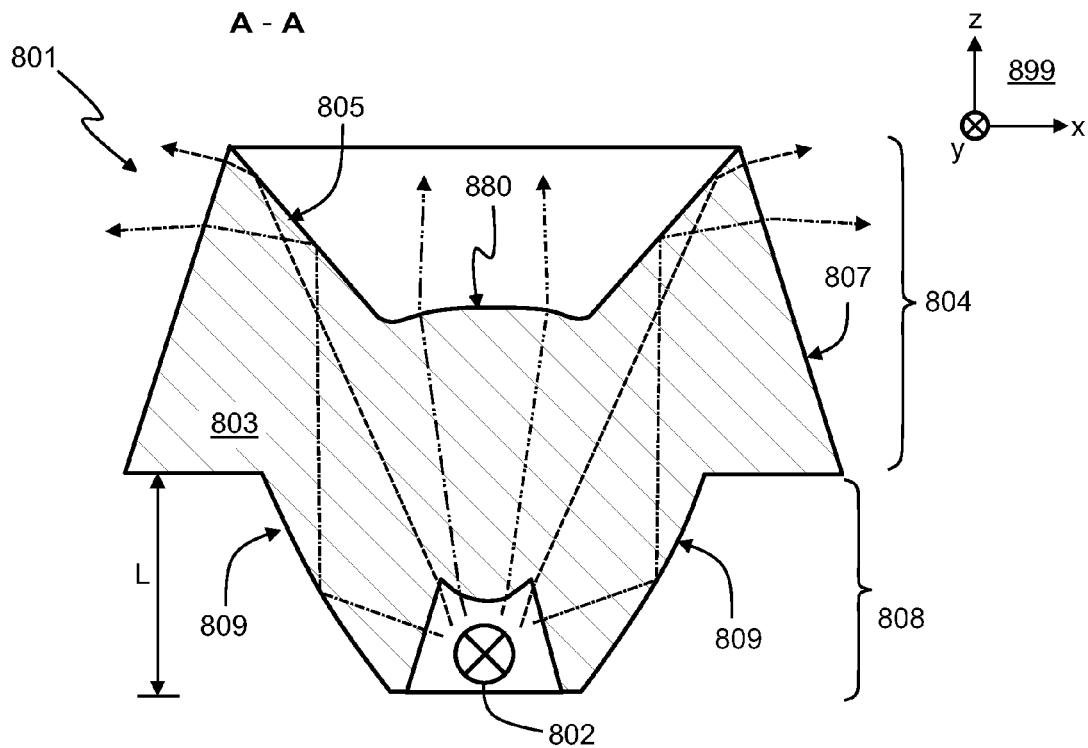

FIG. 8a shows a perspective view of a light guide 801 according to an exemplifying embodiment of the invention. FIG. 8b shows a view of a section taken along a plane that is parallel with the xz-plane of a coordinate system 899 and coincides with a dashed line A-A show in FIG. 8a. The light guide 801 comprises a transparent element 803 that comprises an optical diverter section 804. The optical diverter section 804 comprises a reflective surface 805 that constitutes walls of a notch. The optical diverter section 804 comprises a penetrable surface 807. The transparent element 803 further comprises an optical channel section 808 for receiving light from a light source 802 and for directing the light to the optical diverter section 804. The optical channel section 808 comprises a side surface 809 shaped to provide total reflections for directing light to the optical diverter section 804. In this exemplifying case, the notch does not form a substantially sharp apex contrary to the cases illustrated in FIGS. 2a-2c, 3a-3c, 4a-4c, 5a, 5b, 6a, 6b and 7. Instead, the notch comprises a bottom surface 880 shaped to be penetrable by a part of the light coming from the optical channel section 808 to the optical diverter section 804. In FIG. 8b, some of light beams reflected from the reflective surface 805 are depicted with dashed line arrows, some of light beams reflected first from the side surface 809 and then from the reflective surface 805 are depicted with dash-and-dot line arrows, and some of light beams penetrating the bottom surface 880 are depicted with dash-and-double-dot line arrows. In the exemplifying case illustrated in FIGS. 8a and 8b, the bottom surface 808 is convex for focusing light. It is also possible that the bottom surface is concave for dispersing light, or the bottom surface can be planar and it can be oriented so that it refracts the light in a desired way. It is also possible that the bottom surface has an undulating form for scattering light. Yet furthermore, the bottom surface can be a color mixing surface so that it comprises converging and diverging deviations from a planar shape. In a color mixing surface light beams exhibiting different wavelengths are effectively mixed thus producing a light pattern which contains all wavelengths evenly distributed across the pattern. By equipping the light guide 801 with one or more color mixing surfaces of the kind described above, different colors resulting from defects in the light source are effectively mixed thus producing a solid light pattern.

Figure 9A:
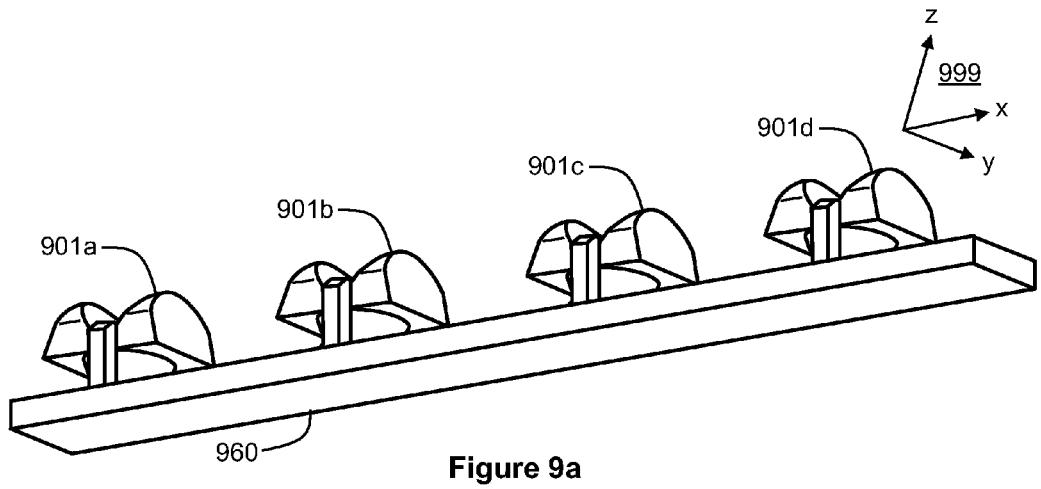
FIGS. 9a, 9b and 9c illustrate illuminator devices according to exemplifying embodiments of the invention.
Figure 9B:
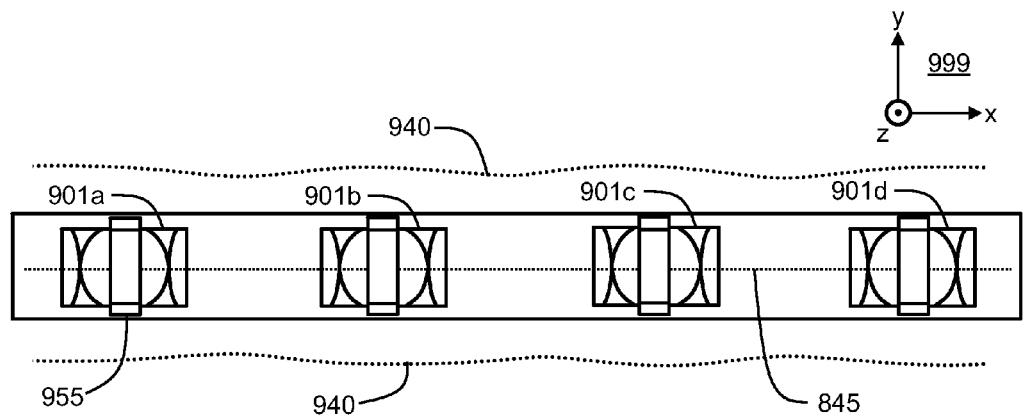

FIGS. 9a shows a perspective view of an illuminator device according to an exemplifying embodiment of the invention. FIG. 9b shows the illuminator device seen from above, i.e. the direction of looking is against the positive z-direction of the coordinate system 999. The illuminator device comprises light guides 901a, 901b, 901c and 901d, and light sources each emitting light to one of the light guides. Each light source can be, for example, a light emitting diode "LED".

Each of the light guides 901a-901d is according to an embodiment of the invention. The light sources are not show in FIGS. 9a and 9b. The light guides are positioned along a geometric line 945 so that the light guides are arranged to direct the light along the geometric line. The light guides 901a-901d are fastened to a base plate 960 with the aid of holder elements. One of the holder elements is denoted with a reference number 955 in FIG. 9b. In the exemplifying case shown in FIGS. 9a and 9b, the light guides are located on the surface of the base plate 960. It is also possible that the base plate comprises apertures and the optical channel sections of the light guides are in the apertures. The light sources and the light guides create an elongated light distribution pattern that is illustrated with dashed lines 940.

Figure 9C:
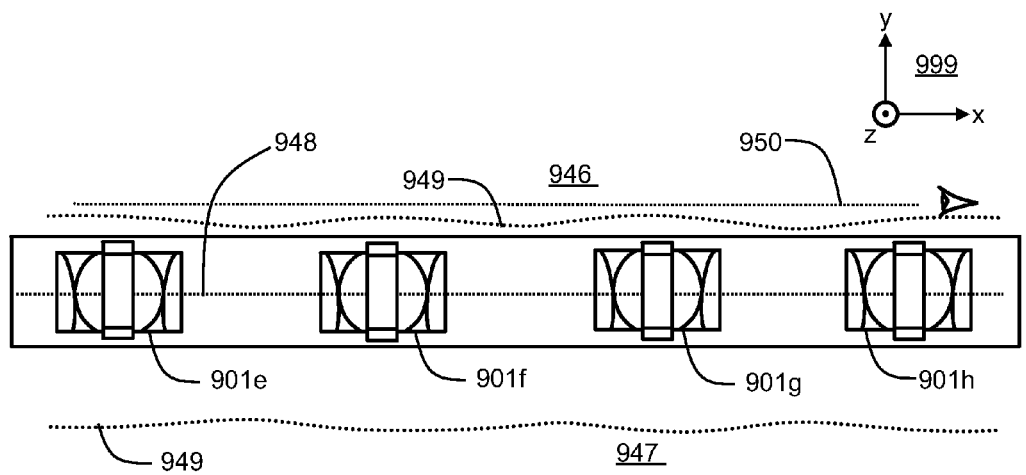

FIG. 9c shows an illuminator device according to another exemplifying embodiment of the invention. The illuminator device comprises light guides 901e, 901f, 901g and 901h, and light sources each emitting light to one of the light guides. The light sources are not show in FIG. 9c. The light guides are positioned along a geometric line 948. In this case, the light guides are asymmetric so that each light guide directs more light to a first half-space 947 on a first side of the geometric line 948 than to a second half-space 946 on the second side of the geometric line. The light guides 901e-901h can be, for example, such as the light guide 401 illustrated in FIGS. 4a, 4b and 4c, or such as the light guide 501 illustrated in FIGS. 5a and 5b, or such as the light guide 601 illustrated in FIGS. 6a and 6b. The light sources and the light guides create an elongated light distribution pattern that is illustrated with dashed lines 949. As can be seen from FIG. 9c, the light distribution pattern is located asymmetrically with respect to the geometric line 948. The asymmetric light distribution pattern is advantageous, for example, in applications where a looking direction is along a geometric line 950 and smooth illumination is needed on the first half-space 947. This kind of situation can occur for example when a shelf of a shop needs to be smoothly illuminated without causing glare.

The specific examples provided in the description given above should not be construed as limiting the scope and/or the applicability of the appended claims. In the above-presented examples, the light guide comprises only transparent material. However, in some cases, the light guide may comprise also parts made of non-transparent material such as, for example, parts for providing mechanical support to the light source.

What is claimed is:

1. A light guide for modifying a light distribution pattern of a point-form light source, comprising:
a transparent element made of transparent material having refractive index greater than unity,
the transparent element having an optical diverter section that comprises:
reflective surfaces constituting walls of an apex extending into the diverter section, the reflective surfaces being shaped to provide total reflections for directing light into directions lateral with respect to a direction in which the apex extends into the diverter section, and first and second ones of the reflective surfaces intersecting each other along a line having first and second ends and constituting the apex; and
penetrable surfaces each being on a route of light reflected from one of the reflective surfaces,
wherein the transparent element further comprises an optical channel section for receiving light from the point-form light source and for directing at least a part of the received light to the reflective surfaces of the optical diverter section, the optical channel section being shaped to broaden towards the optical diverter section and comprising a side surface shaped to provide total reflections for directing, towards the optical diverter section, at least a part of light falling to the side surface, and wherein the optical channel section is shaped to broaden in a direction of the line constituting the tip of the apex and also in the direction perpendicular to the line so as to be suitable for the point-form light source.

2. The light guide according to claim 1, wherein the optical channel section comprises a cavity for the light guide and a bottom of the cavity is inclined with respect to a length of the optical channel section so as to skew a distribution of the light arriving at the optical diverter section.

3. The light guide according to claim 1, wherein the side surface of the optical channel section is shaped to collimate light beams falling to the side surface to be substantially mutually parallel.

4. The light guide according to claim 1, wherein the transparent material of the light guide is one of the following: acrylic plastic, polycarbonate, optical silicone, glass.

5. The light guide according to claim 1, wherein a third one of the reflective surfaces joins the first and second ones of the reflective surfaces and the first end of the line constituting the apex.

6. The light guide according to claim 5, wherein a section profile of the third one of the reflective surfaces is a round-shaped arc extending from the first one of the reflective surfaces to the second one of the reflective surfaces and a section profile of the penetrable surface has a U-shaped form, the section profiles being taken along a geometric plane perpendicular to a length of the optical channel section.

7. The light guide according to claim 1, wherein the walls of the apex consists only of the first and second ones of the reflective surfaces, the light reflected from the first one of the reflective surfaces penetrating a first one of the penetrable surfaces and the light reflected from the second one of the reflective surfaces penetrating a second one of the penetrable surfaces where the first and second ones of the penetrable surfaces are separate from each other and on opposite sides of the transparent element.

8. The light guide according to claim 7, wherein an angle between projections of main axes of distribution patterns of the light reflected from the first one of the reflective surfaces and penetrated the first one of the penetrable surfaces and the light reflected from the second one of the reflective surfaces and penetrated the second one of the penetrable surfaces is substantially 180 degrees, the projections being on a geometric plane perpendicular to a length of the optical channel section.

9. The light guide according to claim 7, wherein an angle between the line constituting the apex and a line parallel with a length of the optical channel section differs from 90 degrees.

10. The light guide according to claim 7, wherein an angle between projections of perpendiculars of the first and second ones of the penetrable surfaces differs from 180 degrees, the projections being on a geometric plane perpendicular to a length of the optical channel section.

11. An illuminator device comprising:
one or more light guides; and
one or more point-form light sources that each emit light to one of the one or more light guides,
each light guide comprising a transparent element made of transparent material having refractive index greater than unity,
the transparent element having an optical diverter section that comprises:
reflective surfaces constituting walls of an apex extending into the diverter section, the reflective surfaces being shaped to provide total reflections for directing light into directions lateral with respect to a direction in which the apex extends into the diverter section, and first and second ones of the reflective surfaces intersecting each other along a line having first and second ends and constituting the apex, and penetrable surfaces each being on a route of light reflected from one of the reflective surfaces, wherein the transparent element further comprises an optical channel section for receiving light from one of the one or more point-form light sources and for directing at least a part of the received light to the reflective surfaces of the optical diverter section, the optical channel section being shaped to broaden towards the optical diverter section and comprising a side surface shaped to provide total reflections for directing, towards the optical diverter section, at least a part of light falling to the side surface, and wherein the optical channel section is shaped to broaden in a direction of the line constituting the tip of the apex and also in the direction perpendicular to the line so as to be suitable for the point-form light source.

12. The illuminator device according to claim 11, wherein:
the apex consists only of the first and second ones of the reflective surfaces, the light reflected from the first one of the reflective surfaces penetrating a first one of the penetrable surfaces and the light reflected from the second one of the reflective surfaces penetrating a second one of the penetrable surfaces where the first and second ones of the penetrable surfaces are separate from each other and on opposite sides of the transparent element, and the light guides are positioned along a geometric line so that the light guides are arranged to direct the light along the geometric line.

13. The illuminator device according to claim 12, wherein an angle between the line constituting the apex of each light guide and a line parallel with a length of the optical channel section of this light guide differs from 90 degrees, and the light guides are positioned along the geometric line so that each light guide directs more light to a first half-space on a first side of the geometric line than to a second half-space on a second side of the geometric line.

14. The illuminator device according to claim 12, wherein an angle between projections of perpendiculars of the first and second ones of the penetrable surfaces of each light guide differs from 180 degrees, the projections being on a geometric plane perpendicular to a length of the optical channel section of this light guide, and the light guides are positioned along the geometric line so that each light guide directs more light to a first half-space on a first side of the geometric line than to a second half-space on a second side of the geometric line.

15. The illuminator device according to claim 12, wherein the optical channel section of each light guide comprises a cavity for the light guide and a bottom of the cavity is inclined with respect to a length of the optical channel section so as to skew a distribution of the light arriving at the optical diverter section of that light guide, and the light guides are positioned along the geometric line so that each light guide directs more light to a first half-space on a first side of the geometric line than to a second half-space on a second side of the geometric line.

16. A mold having a form suitable for manufacturing, by mold casting, a transparent element of a light guide, the transparent element including an optical diverter section comprising:

reflective surfaces constituting walls of an apex extending into the diverter section, the reflective surfaces being shaped to provide total reflections for directing light into directions lateral with respect to a direction in which the apex extends into the diverter section, and first and second ones of the reflective surfaces intersecting each other along a line having first and second ends and constituting the apex; and penetrable surfaces each being on a route of light reflected from one of the reflective surfaces, wherein the transparent element further comprises an optical channel section for receiving light from a point-form light source and for directing at least a part of the received light to the reflective surfaces of the optical diverter section, the optical channel section being shaped to broaden towards the optical diverter section and comprising a side surface shaped to provide total reflections for directing, towards the optical diverter section, at least a part of light falling to the side surface, and wherein the optical channel section is shaped to broaden in a direction of the line constituting the tip of the apex and also in a direction perpendicular to the line so as to be suitable for the point-form light source.

\* \* \* \* \*